United States Patent
Barton et al.

(10) Patent No.: US 10,929,832 B2
(45) Date of Patent: Feb. 23, 2021

(54) METHOD AND SYSTEM FOR ELECTRONIC WALLET ACCESS

(75) Inventors: Loren Barton, London (GB); Eric Crozier, Hockessin, DE (US); Glenn Curtiss McMillen, Downingtown, PA (US); David A. Crake, Newark, DE (US); John Bauer, Downingtown, PA (US); Garry R. Lloyd, Northampton (GB); Christine Ann Schuetz, Chadds Ford, PA (US)

(73) Assignee: Barclays Execution Services Limited, London (GB)

(*) Notice: Subject to any disclaimer, the term of this patent is extended or adjusted under 35 U.S.C. 154(b) by 0 days.

(21) Appl. No.: 13/225,898

(22) Filed: Sep. 6, 2011

(65) Prior Publication Data

US 2013/0060618 A1   Mar. 7, 2013

(51) Int. Cl.
*G06Q 40/00* (2012.01)
*H04L 9/00* (2006.01)
*G06Q 20/32* (2012.01)
*G06Q 20/36* (2012.01)

(52) U.S. Cl.
CPC ..... *G06Q 20/3223* (2013.01); *G06Q 20/3674* (2013.01)

(58) Field of Classification Search
CPC .. G06Q 40/00; G06Q 20/105; G06Q 20/3223; G06Q 20/3674; G06K 19/073; H04L 9/00; H04L 9/32; H04L 29/06; H04L 63/0815; H04K 1/00
USPC .......................................................... 705/41
See application file for complete search history.

(56) References Cited

U.S. PATENT DOCUMENTS

| | | | | |
|---|---|---|---|---|
| 7,136,490 B2* | 11/2006 | Martinez | ................. | G06F 21/31 380/284 |
| 7,469,151 B2 | 12/2008 | Khan et al. | | |
| 8,200,582 B1* | 6/2012 | Zhu | ........................ | G06F 21/31 705/64 |
| 8,201,217 B1* | 6/2012 | Begen | ................. | H04L 63/0815 726/3 |
| 2010/0125508 A1 | 5/2010 | Smith | | |

(Continued)

FOREIGN PATENT DOCUMENTS

WO       WO2006128215       12/2006

*Primary Examiner* — Clifford B Madamba
(74) *Attorney, Agent, or Firm* — Foley & Lardner LLP

(57) ABSTRACT

A mobile payment system is described that facilitates efficient and secured payment transactions from an electronic wallet on a user portable electronic device with a merchant point of sale terminal over a communication link. In one aspect, a mobile device is configured for transaction operations from a plurality of mobile transaction accounts in an electronic wallet. The mobile device includes a plurality of transaction modules operable to process transaction operations with a respective mobile transaction account, each transaction module configured for transaction operations to be completed after an authentication process using a central authentication module coupled to the plurality of transaction modules, operable to verify a user input passcode and to respond to authentication requests from the plurality of transaction module after the user input passcode is verified. Preferably, at least one of the transaction modules is configured for contactless transaction operations over a contactless communication link.

17 Claims, 6 Drawing Sheets

(56) References Cited

U.S. PATENT DOCUMENTS

2012/0095852 A1* 4/2012 Bauer ................ G06Q 20/105
  705/16
2012/0197691 A1* 8/2012 Grigg ................ G06Q 20/363
  705/14.1

* cited by examiner

METHOD AND SYSTEM FOR ELECTRONIC WALLET ACCESS

FIELD OF THE INVENTION

This invention relates to a method and system for electronic wallet access in a mobile transaction system, and more particularly to authentication or authorization mechanisms for secure transaction operations by a mobile device at an electronic point of sale location.

BACKGROUND OF THE INVENTION

Mobile payment account systems are generally known in which portable electronic devices are configured to provide payment from an electronic wallet. Typically, these portable electronic devices are configured to enable a contactless communication with a merchant Point of Sale (POS) terminal to carry out a payment transaction, for example using near field communication (NFC) technology. As described in the Applicant's applications U.S. patent application Ser. No. 12/891,866, entitled "METHOD AND SYSTEM FOR ELECTRONIC WALLET ACCESS", filed Oct. 15, 2010 ('866 application), U.S. patent application Ser. No. 12/905,419, entitled "MOBILE PAYMENT SYSTEM", filed Sep. 28, 2010 ('419 application), and U.S. patent application Ser. No. 12/955,373, entitled "METHOD AND SYSTEM FOR ACCOUNT MANAGEMENT AND ELECTRONIC WALLET ACCESS ON A MOBILE DEVICE", filed Nov. 29, 2010 (373 application), all of which are incorporated herein by reference in their entirety, activated mobile payment account data may be stored in the secure memory of the portable electronic device which can then be used to carry out transactions with the merchant electronic POS terminal via a NFC link.

Typically, application logic, applets, modules or the like in the portable electronic device for handling electronic wallet transactions require user validation by requesting the user to first enter a correct passcode to ensure the user really wants the transaction to be executed. This prevents "virtual pickpocketing" by the application controlling the response to the POS terminal only when the user has successfully authenticated the transaction.

As the use of mobile payment systems becomes more prevalent, payment account issuers are seeking to expand the products and services that are provided in a mobile electronic wallet. For example, an electronic wallet could be used for a plurality of different forms of transactions, such as payments, ticketing, coupons or other activities, and payments could be made from one of a plurality of payment accounts from the same issuer. Each additional product or service from an issuer may require one or more separate application logic or modules in the portable electronic device for handling control, user verification and access to that particular product or service over contactless transaction communication protocols using a respective security mechanism. Therefore, as additional products and services are added to the mobile electronic wallet, the user is burdened with an increasingly complex system, particularly if each of the plurality of security mechanisms involves different user verification passcodes or personal identification numbers (PIN).

What is desired is a more efficient mobile transaction system and method which facilitates expedient and secured transactions from a plurality of applications in an electronic wallet without comprising the security of the system against fraudulent use of the electronic wallet.

SUMMARY OF THE INVENTION

According to one aspect of the present invention, a system is provided for management of a plurality of application logic or modules in a mobile device secure element to be controlled via a single authentication (or authorization) mechanism. The system facilitates secure authentication of a user using a single controlling passcode or PIN to subsequently allow action by the plurality of application logic or modules within the issuer's control. The application logic or modules are preferably transaction applets that interact with another device (for example, a POS terminal) over communication protocols and could be used for a variety of applications such as payment, ticketing, coupons, or other activities.

An advantage of such a system is that customers authenticate to the issuer for a variety of products and services using the same passcode as an authentication value. This allows customers to not have to remember a separate passcode for each payment product from the same issuer, and to use the same passcode to obtain servicing of the accounts from the mobile device. This single passcode is intended to apply to all items within the security domain of the same issuer who is primarily liable for the applications used. Since the issuer is responsible for ensuring the payment credentials are validated for accessing the payment, it is their general responsibility to ensure the entered passcode is the customer's correct passcode.

In another aspect of the present invention is a method of handling a mobile transaction operation whereby the single controlling passcode is entered by a user to the mobile application. This passcode information is transmitted to the central issuer authentication applet inside the secure element for verification. The passcode is verified against local rules and counters inside an authentication applet to ensure the applets are not locked out or otherwise unusable. A subordinate applet is then available for use with a mobile transaction. Execution is then directed to the subordinate applet where it will have the PIN verified state set and the transaction will be allowed over the associated communication interface.

In one embodiment the authentication applet controls the passcode verification from the subordinate applet. In an alternative embodiment the passcode verification process has the authentication applet directly calling the subordinate applet for simulating passcode entry to manage multiple passcodes to multiple applets. Advantageously, one controlling passcode is used in an authentication applet to dictate usage to a series of subordinate applets all within the ownership rights of the security domain of the entire collection of applets.

The controlling passcode could be implemented using any number of methods including a word, phrase, numeric PIN, on-screen path gesture, or facial recognition. The passcode entered by the customer and held by the subordinate applets could be the actual passcode entered by the user or it could optionally be mapped to a passcode held by the authentication applet. This provides greater flexibility in the mobile device allowing for pass phrases or gesture based interactions and translating into something a subordinate applet requires such as a four digit PIN for instance.

In yet a further aspect of the present invention there is provided a portable device and computer program arranged to carry out the above method when executed by a portable device.

BRIEF DESCRIPTION OF THE DRAWINGS

There now follows, by way of example only, a detailed description of embodiments of the present invention, with references to the figures identified below.

DETAILED DESCRIPTION THE INVENTION

Figure 1:
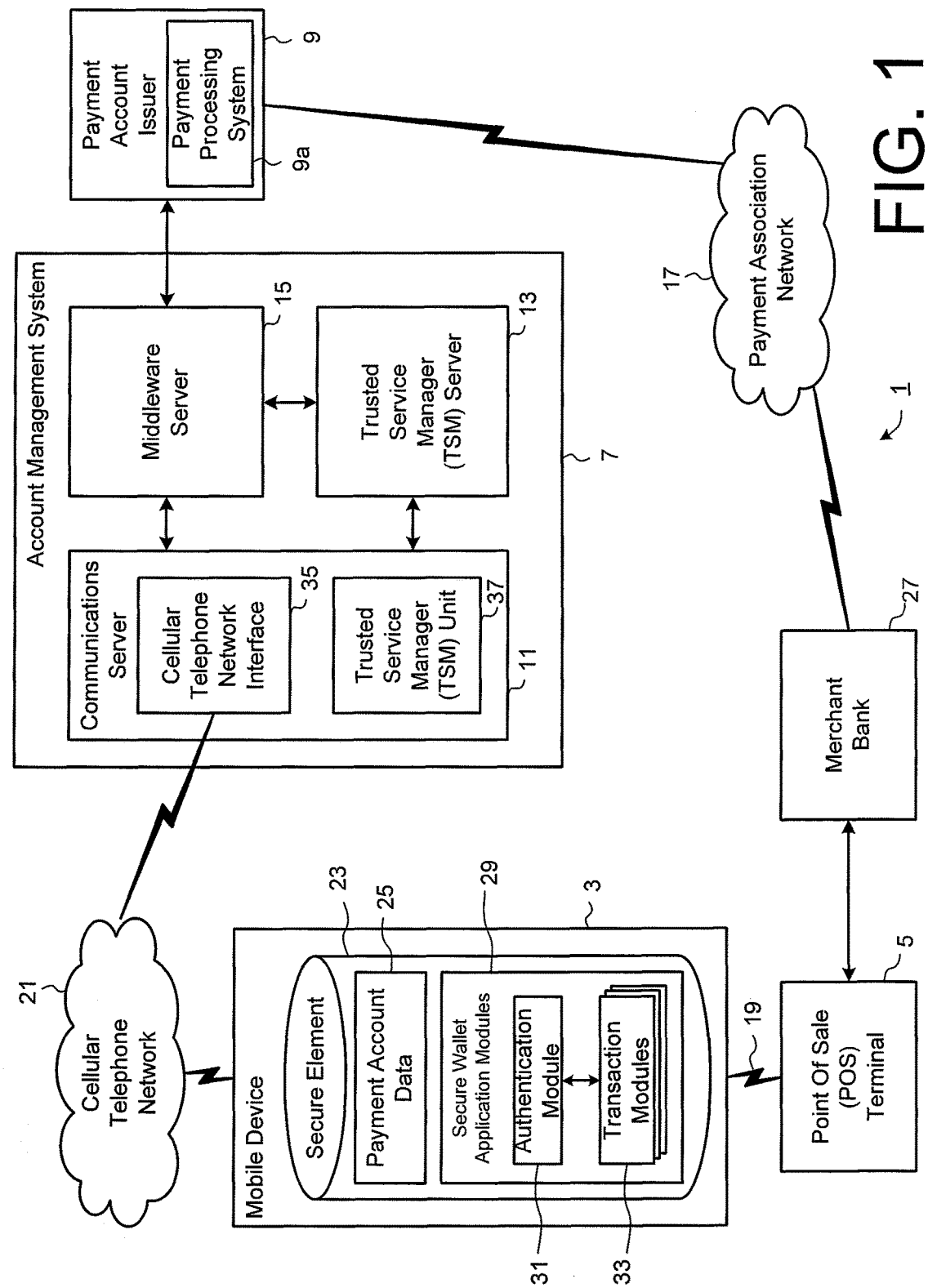
FIG. 1 is a block diagram showing the main components of a mobile transaction system according to an embodiment of the invention.

Referring to FIG. 1, a mobile transaction system 1 according to an embodiment comprises a mobile device 3, a merchant's electronic Point of Sale (POS) terminal 5 as commonly known in the field, and an account management system 7 associated with a payment account issuer 9, all of which communicate electronically with one another. The account management system 7 may provide for mobile payment account creation and activation, transaction authorization, and other related functionality, as described in the above-referenced '866 application, '419 application, and '373 application.

The account management system 7 includes a communications server 11 and a Trusted Service Manager (TSM) server 13 for facilitating communication between a middleware server 15 and the mobile device 3. The payment account issuer 9 includes a payment processing (authorization and fraud monitoring) system 9a for authorizing and effecting payment transactions from payment accounts associated with the payment account issuer 9 in response to payment transaction instructions received via a payment association network 17.

In accordance with a preferred embodiment, the mobile device 3 and the electronic POS terminal 5 communicate with one another over a contactless communication link 19 via respective contactless communication interfaces. It is appreciated that this contactless communication link 19 may be a near field communication (NFC) link, an infra-red link, an ultra-sonic link, an optical link, a radio frequency (eg. RFID) link, a wireless link such as Bluetooth or Wi-Fi based on the IEEE 802.11 standards, or any other communication link that does not require direct physical contact. The mobile device 3 may also communicate with the account management system 7 over a cellular telephone network 21 via a cellular network interface.

As shown in FIG. 1, the mobile device 3, that is an electronic wallet as the term is used herein, includes a secure element 23 storing payment account data (that is, electronic wallet data) 25 for one or more mobile payment accounts that are set up on the mobile device 3. The secure element 23 can be a Universal Integrated Circuit Card (UICC) secure element, any other secure memory configurations such as embedded secure element chips, or as part of a peripheral accessory device to the mobile device such as a micro Secure Digital card, otherwise known as a micro SD card, as are known in the art. Other forms of mobile handset software and/or hardware can be implemented to provide built-in secure electronic wallet functionality for accessing the secure element 23, including encryption and decryption of the payment account data 25, as necessary. The mobile device 3 can be configured with built-in functionality providing access to the secure element 23 on the Subscriber Identity Module (SIM) card in the mobile device 3.

In accordance with a preferred embodiment as shown with reference to FIG. 1, payment account data 25 for a mobile payment account that is securely stored in the mobile device 3 includes data identifying a user's account at a payment account issuer 9 from which funds can be transferred to the merchant bank 27 to complete a transaction via a payment association network 17. The payment account data 25 can additionally include data defining an amount of pre-paid funds that have been transferred from the user's payment account issuer 9 to that mobile payment account. In this way, the electronic wallet can include a payment account linked to multiple funding sources, such as a pre-paid account, deposit account and/or credit account. As an alternative, the electronic wallet can include a plurality of mobile payment accounts, each linked to a respective funding source.

The mobile device 3 also includes a plurality of secure wallet application modules 29 storing processing instructions in the secure element 23. In accordance with a preferred embodiment of the present invention the processing instructions are computer-implementable instructions. The processing instructions are used to control the operation of the mobile device 3, to facilitate the application for and management of one or more mobile payment accounts on the mobile device 3, and to handle the process of conducting a transaction with a merchant via the electronic POS terminal 5. A payment transaction with a merchant via the electronic POS terminal 5 is facilitated using a mobile payment account on the mobile device 3 to effectively transfer funds from the mobile payment account on the mobile device 3, or an associated payment account issuer 9, to the merchant. Other forms of transactions will be apparent to the skilled person to facilitate ticketing, coupons, and other activities.

The secure wallet application module 29 can be implemented as one or more software components of an operating system running on the mobile device 3 or implemented as one or more separate software applications installed on the mobile device 3. In this embodiment, the secure wallet application module 29 comprises an authentication module 31 for verifying or validating a user to conduct a transaction using a provisioned mobile payment account, and a plurality of transaction modules 33 for facilitating transactions using an activated mobile payment account after the user has been validated. As will be described in greater detail below, one authentication module 31 associated with a single controlling passcode is provided to dictate usage to a series of subordinate transaction modules 33 that are all within the ownership rights of the security domain for the collection of modules of a particular issuer. The authentication and transaction modules described herein are preferably software applications (such as applets), and can be configured to run as background applications on the mobile device 3. The software applications monitor receipt of messages or events and activate upon receipt of appropriate messages or events so as to carry out the above operations. The software applications can alternatively be launched by the user. Alternatively, the secure wallet application modules 29 (that is, the authentication module and transaction modules) are loaded into a virtual machine of the mobile device 3 to provide the functionality of the present embodiment.

A secure mobile payment account provisioning and activation process can be carried out between the mobile device 3 and the account management system 7, as described in the above referenced '866 application. The activated mobile payment account data stored in the secure element 23 of the mobile device 3 is then used to carry out payment transactions with a merchant electronic POS terminal 5 via the contactless communication link 19, whereby a requested amount of funds is transferred from the mobile payment account stored in the mobile device 3 to the merchant's bank 27. Techniques and protocols for implementing the authorization and transfer of funds between the merchant POS terminal 5, the merchant bank 27, and the payment account issuer 9 via the payment association network 17 are well known to those skilled in the art and are therefore not described further herein.

As shown in FIG. 1, the account management system 7 includes a communications server 11, a middleware server 15, and a Trusted Service manager (TSM) server 13, which communicate electronically with one another via secure network links over a private Local Area Network (LAN), a Virtual Private Network (VPN) connection, or other dedicated secure connection. It is appreciated that, although the components of the account management system 7 in this embodiment are provided as separate servers, one or more of the servers could be provided as software and/or hardware modules in the same server.

Data is communicated between the mobile device 3 and the middleware server 15 over the cellular telephone network 21 via a cellular telephone network interface 35 of the communications server 11. The TSM server 13 performs logical data preparation of the data to be communicated to the mobile device 3 by forming appropriate commands to be written to the secure element 23 of the mobile device 3. The precise form of the data depends on the particular implementation of the secure element 23 of the mobile device 3 and/or the payment association scheme program for facilitating payment. The TSM server 13 can also perform encryption of the data, for example, of the sensitive payment account information, for example, payment keys, in the mobile payment account data 25. The TSM server 13 then passes the encrypted data to the mobile device 3 via the communications server 11 and the cellular telephone network 21.

In the exemplary embodiment shown in FIG. 1, the communications server 11 includes a separate TSM unit 37 for establishing a trusted communication channel with a mobile device 3 via the cellular telephone network 21, and for securely routing the data to the mobile device 3. In the above example, the TSM unit 37 in the communications server 11 would not access any of the sensitive portions of the encrypted data that are routed to the mobile device 3 via the cellular telephone network interface 35. It is appreciated that the functionality of the TSM unit may be integrated with the cellular telephone network interface.

Figure 2:
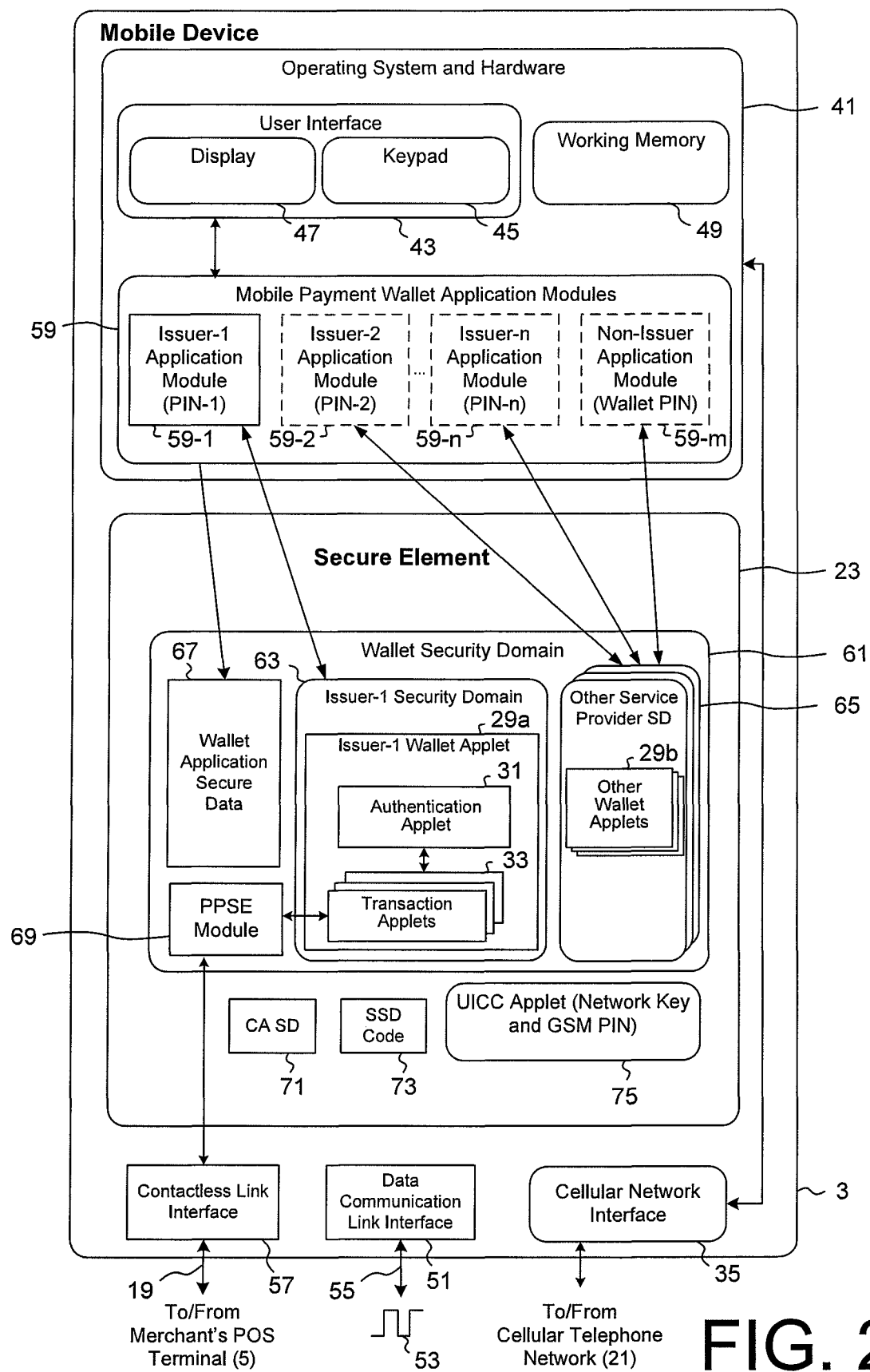
FIG. 2 is a block diagram showing the main hardware and/or software elements of a mobile device shown in FIG. 1 according to an embodiment.

FIG. 2 shows the elements of the mobile device 3 according to an embodiment of the present invention. In this embodiment, the mobile device 3 is a mobile handset. The mobile handset operating system and hardware 41 include a user interface 43 arranged to process inputs from a keypad 45 and to control output on a display 47. As those skilled in the art will appreciate, the keypad 45 and display 47 may be provided as separate hardware entities of the mobile device 3 or may alternatively be provided as an integrated entity, for example, as a touch sensitive display screen user interface element as is known in the art. The mobile device 3 may also include components included in commonly known mobile handsets, such as a microphone, an earpiece speaker, camera and controller, GPS sensors etc, which are not shown for clarity. A working memory 49 is provided for use by the handset operating system and hardware units 41.

Software and data may be transferred via the cellular network interface 35 or via a different data communication link interface 51, for example, in the form of signals 53, which may be electronic, electromagnetic, optical, or other signals capable of being received by the data communication link interface 51 via a communication path 55 that carries the signals 53 and may be implemented using wire or cable, fiber optics, a physical phone line, a wireless link, a radio frequency link, or any other suitable communication channel. For instance, communication path 55 may be implemented using a combination of channels. As those skilled in the art will appreciate, the communication path 55 may be linked or merged with the communication path from the cellular network interface 35 to the cellular telephone network 21.

As mentioned above, the mobile device 3 includes a secure element 23. The mobile device 3 is operable to receive the payment account data 25 and activation request messages from and send validation messages to the account management system 7 via a cellular telephone network interface 35 and the cellular telephone network 21. The mobile device 3 is also operable to store the received payment account data 25 in the secure element 23. The mobile device 3 is also operable to receive transaction authorization request messages from and send authorization messages to the merchant's POS terminal 5 via a contactless communication link interface 57 and the contactless communication link 19. Communication between a POS terminal 5 and the mobile device 3 can involve transmission of data in a single direction from the mobile device 3 to the POS terminal 5, depending on an implemented protocol (such as the protocols used by the DISCOVER ZIP™, MasterCard PayPass™, Visa Paywave™ and AMEX ExpressPay™ cashless payment systems).

The mobile device 3 also includes a plurality of additional mobile payment wallet application modules 59 which are not stored in the secure element 23. The additional wallet application modules 59 store processing instructions used to control the operation of the mobile device 3 to perform various mobile payment account processes using the secure wallet application modules 29 discussed above. As shown in FIG. 2, a plurality of application modules 59-1, 59-2, **59-*m*, 59-*n*, for example, are provided for carrying out transactions with a plurality of different payment account issuers (referred to as Issuer-1, Issuer-2, . . . Issuer-n) as well as a non-issuer application module 59***m* for carrying out non-issuer related operations. Each application module 59 is operable to call the secure wallet application modules 29 of the corresponding issuer in order to complete the requested transaction after user validation, as will be described in greater detail below. The additional wallet application modules 59 can also include an account creation sub-module and an account activation sub-module (not shown) storing processing instructions to create a request for a new mobile payment account if desired and to carry out a secured account validation and activation processes in response to user input from the keypad 23 as described in the above-referenced '866 application.

Also schematically illustrated in the exemplary embodiment of FIG. 2 are wallet security domains (SD) 61 which can be implemented in the secure element 23 of the mobile device 3. The secure element 23 is advantageously implemented to be compliant with one or more specifications of a standard infrastructure in order to facilitate communication of data and messages between the mobile device 3 (and the secure element 23) and other entities in the mobile payment system 1. For example, and in accordance with a preferred embodiment, the secure element 23 is compliant with the known GlobalPlatform Card Specifications (for example the "GlobalPlatform Card Specification 2.2", March 2006), and accordingly includes a plurality of security domains for facilitating control of the management of and accessibility to executable operations and sensitive data associated with specific areas of the secure element 23 by the various entities in the mobile payment system 1. The GlobalPlatform Card Specifications define a hierarchical arrangement of security domains, each defining functionality and data that can be accessed by a respective associated entity, for example, cryptographic keys or certificates, that can be used to support secure channel protocol operations between the mobile device 3 and the entity or entities associated with that particular security domain, and/or to authorize secure element 23 content management functions.

As shown in the exemplary embodiment of FIG. 2, the secure element 23 includes a wallet security domain 61 associated with one or more payment account issuers and other service providers. In this embodiment, the wallet security domain 61 includes a security domain 63 associated with the payment account issuer 9 (referred to as Issuer-1) and the secure wallet application modules 29a for Issuer-1. The secure wallet application modules 29a are provided as an applet package associated with Issuer-1, and include an authentication applet instance 31 and a plurality of transaction applet instances 33 which enable the transaction processing functionality using an activated mobile payment account. The authentication applet instance 31 and the plurality of transaction applet instances 33 correspond to the authentication module 31 and the transaction modules 33 respectively shown in FIG. 1. The wallet security domain 61 also includes one or more other service provider security domains 65 each associated with respective one or more other wallet application modules 29b. The wallet security domain 61 also includes wallet application secure data 67 for use by the wallet application modules 59. The payment account data 25 (not shown in FIG. 2 for clarity) is also securely stored in the wallet security domain 61, for example, within the wallet application secure data 67.

The wallet security domain 61 also includes a Proximity Payment System Environment (PPSE) module 69, defining application functionality associated with transaction processing functionality and, in particular, for handling communications with a contactless reader of the POS terminal 5 to identify which of the one or more mobile payment accounts is to respond. The PPSE module 69 facilitates an additional application layer level of control of the transaction processing functionality between a respective one of the transaction applet instances 33 and the contactless communication link interface 57. The PPSE module 69 is a program module inside the secure element 23 but is generally provided in a security domain associated with and controlled by the owner of the secure element 23 and not with a specific payment account issuer 9, thus providing for segregation that allows for privacy among issuers and mobile operators.

The wallet security domain 61 also includes a Controlling Authority (CA) security domain 71 associated with a controlling authority in the mobile payment system 1 and a Supplementary Security Domain (SSD) code module 73 associated with an intermediate security domain (not shown) to manage card content and perform cryptographic services for confidentiality.

Each security domain will be associated with one or more respective entities in the mobile payment system 1 depending on the particular business model that is implemented by the system. The specific implementation details of the various security domains for compliance with, for example, the GlobalPlatform Card Specifications are outside the scope of this application and will be apparent to those skilled in the art. The secure element 23 also stores a UICC applet 75 which is an application to manage and hold the mobile network operator's functionality and secure information, such as a network key and GSM (Global Systems for Mobile Communications) PIN (Personal Identification Number).

In this embodiment, a central authentication applet 31 residing in the secure element 23 in the Issuer-1 security domain 63 is configured to control verification of the passcode. The central authentication applet 31 is a program that manages and verifies input of the passcode for a mobile application, such as an electronic wallet, as well as managing the passcode communication to the subordinate transaction applets 33 that will control its use over the contactless communication link interface 57 through the PPSE module 69.

Transaction applet instances 33 also reside within the same span of control of an issuer security domain 63. The roles of the transaction applets 33 are for implementing contactless link based transaction and actions such as payment, ticketing, coupon redemption, or other offer interactions. These transaction applets 33 can be defined by an association and are licensed by the authentication applet's issuer and security domain owner. The transaction applets 33 include all the logic and control to execute the associated transactions once the passcode has been verified as being entered correctly by a user.

Typically, execution of each applet is controlled within a security domain to control scope of execution and ability to control the applet. Only those applets with the right security domain access can execute, modify or change the applet. Additionally, each applet has a finite set of exposed interfaces for interacting with the applet over specified channels. Preferably, the authentication applet 31 is used as a central passcode manager among a series of associated subordinate applets associated with the same payment account issuer 9.

First Embodiment

Figure 3:
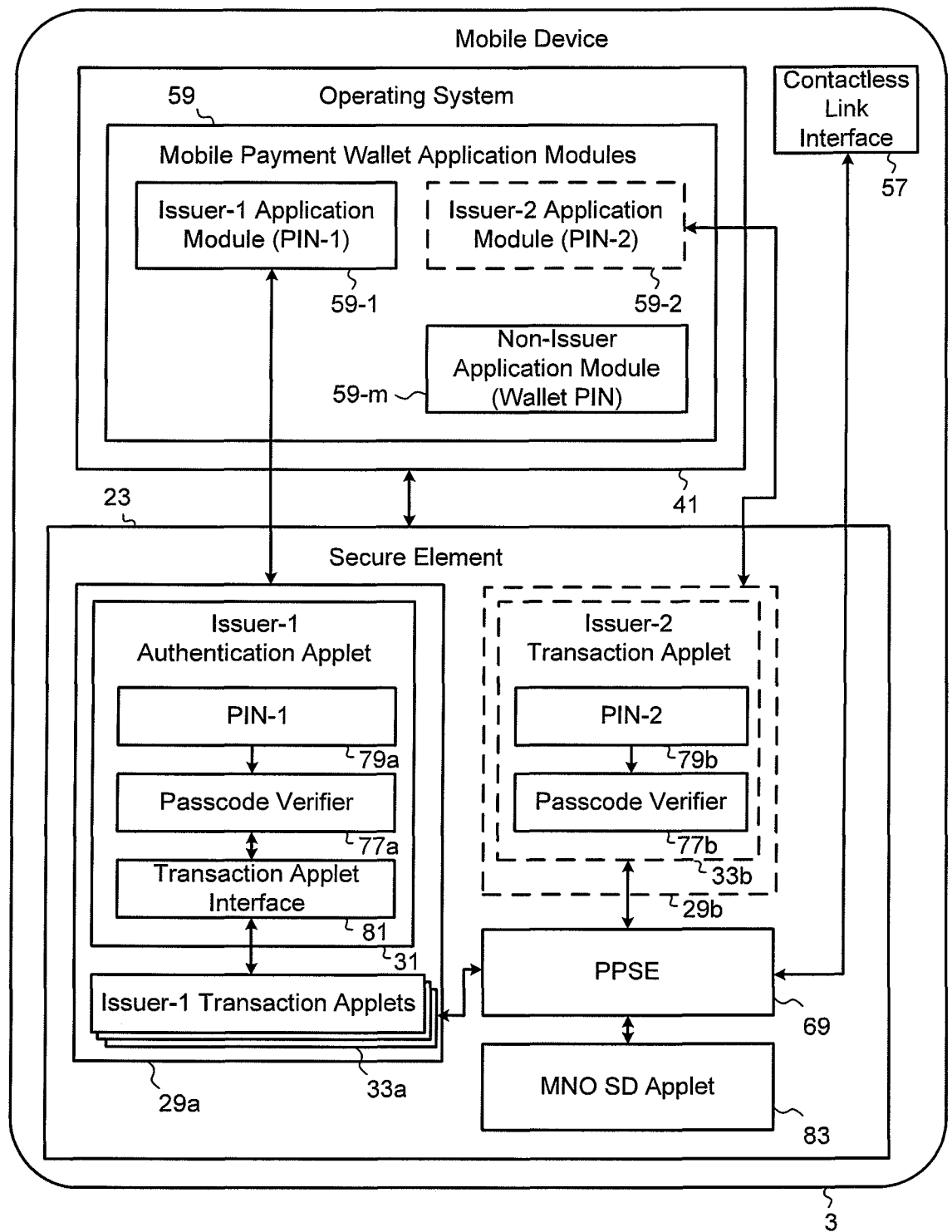
FIG. 3 is a block diagram showing the main functional elements of the mobile device shown in FIG. 2 according to a first embodiment of the invention.

FIG. 3 is a block diagram showing the main functional elements of the mobile device 3 when configured to execute processing instructions of the transaction applets 33 and the authentication applet 31, according to a first embodiment of the invention. As will be discussed in greater detail below, the Issuer-1 application module 59-1 calls the secure wallet application module 29a associated with the payment account issuer 9 to conduct a transaction process, for example, when a user waves the mobile device 3 past the contactless communication interface of the POS terminal 5. As shown in more detail in FIG. 3, the Issuer-1 authentication applet 31 in the secure wallet application module 29a in this embodiment includes a passcode verifier 77*a* functional element for verifying a passcode 79*a* (referred to as PIN-1) associated with all of the transaction applets 33*a* associated with Issuer-1, and a transaction applet interface 81 for communicating the success or failure of user validation by the passcode verifier 79*a* to the Issuer-1 transaction applets 33*a*.

The other application modules 59 provided in the operating system 41 can be configured to communicate with respective secure applets to conduct different transaction processes and functions after user validation using different mechanisms. For example, FIG. 3 shows an example of a typical secure wallet application module 29*b* associated with a different payment account issuer (referred to as Issuer-2) that is optionally provided in addition to the Issuer-1 secure wallet application module 29*a*. This additional secure application module 29*b* can communicate with the Issuer-2 application module 59-2 to conduct transaction processes associated with Issuer-2. In this example, the Issuer-2 application module 29*b* is not configured with a respective central authentication applet and instead provides a passcode verifier 77*b* in the Issuer-2 transaction applet 33*b* for verifying a passcode 79*b* (referred to as PIN-2) that is separately associated with the transaction applet 33*b* associated with Issuer-2. FIG. 3 also shows a non-issuer application module that is configured to provide electronic wallet functionality to a user that is not associated with any particular payment account issuer 9, for example, through a Mobile Network Operator (MNO) secure domain applet 83 for processing and performing functions and actions associated with the mobile network operator, through the cellular telephone network interface 35.

Figure 4:
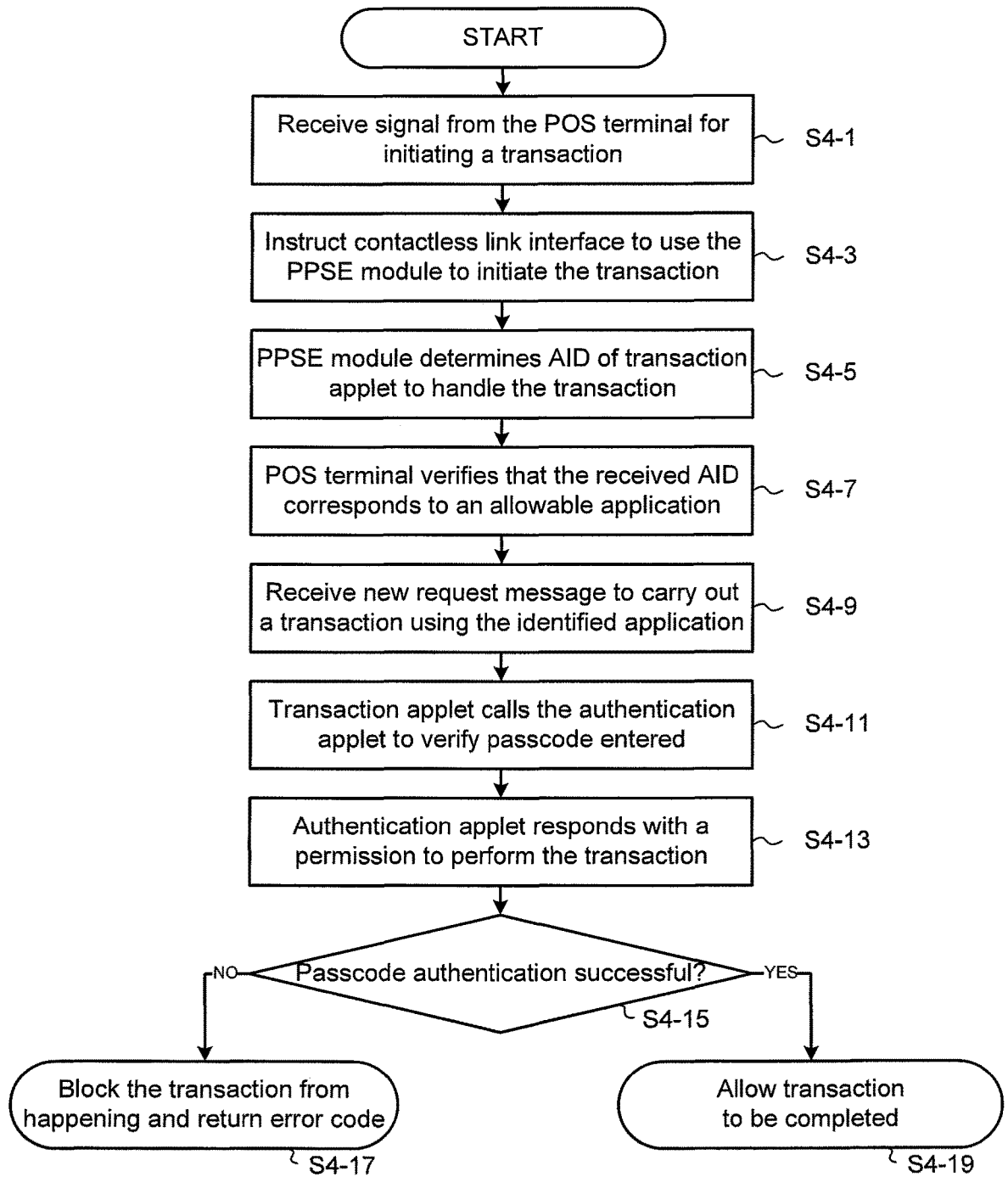
FIG. 4 is a flow diagram illustrating the main processing steps performed by the mobile device of FIG. 3 in a mobile transaction process according to the first embodiment.

A more detailed description of the operation of these components in this first embodiment will now be provided with reference to the flow diagram of FIG. 4 which illustrates a computer-implemented process for a contactless mobile transaction where the plurality of transaction applets 33*a* associated with a payment account issuer 9 uses a central authentication applet 31 for passcode validation. As shown in FIG. 4, the mobile transaction process begins at step S4-1 where the contactless communication link interface 57 and PPSE module 69 pick up or receive a signal from the POS terminal 5 for initiating a transaction. The POS terminal 5 typically sends out a request associated with a specific type of transaction, such as payment or ticketing. In response, at step S4-3, the contactless communication link interface 57 is instructed by the mobile operating system 41 to use the PPSE module 69 to initiate a transaction. The PPSE module 69 typically stores a list of the possible executable application identifiers (AID) within the secure element 23 based upon categories such as payment, ticketing and the like.

The PPSE module 69 determines at step S4-5 a specific AID of a transaction applet 33*a* for execution of the transaction, from the PPSE's list of AIDs, such as an AID for an application which the user has previously selected as their default for that transaction category or type. The PPSE module 69 responds to the POS terminal 5 with the specific AID. At step S4-7, the POS terminal 5 receives and optionally verifies that the AID is within an allowed set or range for that transaction category and proceeds to ask the mobile device 3 in subsequent interactions to execute that specific AID to complete the transaction. Accordingly, at step S4-9, the contactless communication link interface 57 receives a new request message to carry out a transaction using one of transaction issuer applets 33*a* as identified by the AID.

In this embodiment, the subordinate transaction applet 33*a* performing the transaction will call the interface 81 on the authentication applet 31, at step S4-11, to verify that the correct passcode 79*a* was entered by the user. It will be appreciated that the user can authenticate to the authentication applet 31 prior to engaging with the POS terminal 5, whereby the user selects the mobile payment account they wish to use for a transaction, enters in a passcode, and the user input passcode is transmitted to the authentication applet 31 for verification. If the passcode verifier 77*a* determines that the passcode 79*a* is correct and the authentication applet 31 is in a state where it is allowing transactions, the authentication applet 31 will allow the next transaction requested by a transaction applet 33*a* to proceed. Alternatively, the authentication applet 31 is configured to process validation of the controlling passcode (PIN-1) as required in response to a request from the transaction applets 33*a*.

Therefore, at step S4-13, the authentication applet 31 will respond with a permission to perform the requested transaction and any supporting data for the applet to use in the transaction. At step S4-15, the subordinate transaction applet 33*a* determines from the received information if passcode authentication was successful. If the authentication applet 31 was not able to validate the user input passcode, then at step S4-17, the transaction applet 33*a* proceeds to block the transaction from happening and map to a specific error code. On the other hand, if passcode authentication was successful, then at step S4-19, the transaction applet 33*a* proceeds to allow the transaction to take place.

When processing the transaction request, the transaction applet 33*a* determines the required transaction detail information to transmit the POS terminal 5 based upon factors such as whether the passcode verification is in the proper state. Details of how the transaction applets 33*a* perform processing to carry out an allowed transaction are well known to those skilled in the art and are therefore not described further herein. Once the transaction is performed, the Issuer-1 wallet applet can prevent further transactions without subsequent authentication. This also prevents "virtual pickpocketing" by ensuring only the intended transaction is performed.

The authentication applet 31 can also process the request from the subordinate transaction applet 33*a* to ensure the request is properly made from an allowed transaction applet 33*a*, before starting the verification process. The authentication applet 31 stores the passcode 79*a* and an allowed number of possible user input attempts of the passcode before blocking any transactions from proceeding before a passcode reset. If the number of incorrect entries exceeds the configured maximum entries before a successful passcode validation, the authentication applet 31 will not allow any more transaction attempts. Once locked, a controlling passcode reset process is typically performed by the issuer of the authentication applet 31 through a trusted service manager connection into the secure element 23 where commands are sent to the secure element 23 to reset the counter in a conventional manner.

The initial instantiation and setting of the controlling passcode is a process managed by the payment account issuer 9 and the issuer's TSM server 13. The issuer's security domain 63 can be set up by the TSM server 13 and the authentication applet 31 can be installed and instantiated into the issuer's security domain 63. The TSM server 13 can then send commands to make the authentication applet 31 available for execution and initialize the passcode into an initial state along with passcode counters.

The authentication applet 31 is configured in the issuer's security domain 63 so that it can limit the interfaces allowed to execute commands to a finite set of wallet applications in the mobile handset operating system, as well as verification requests coming from the transaction applets 33a.

Second Embodiment

Figure 5:
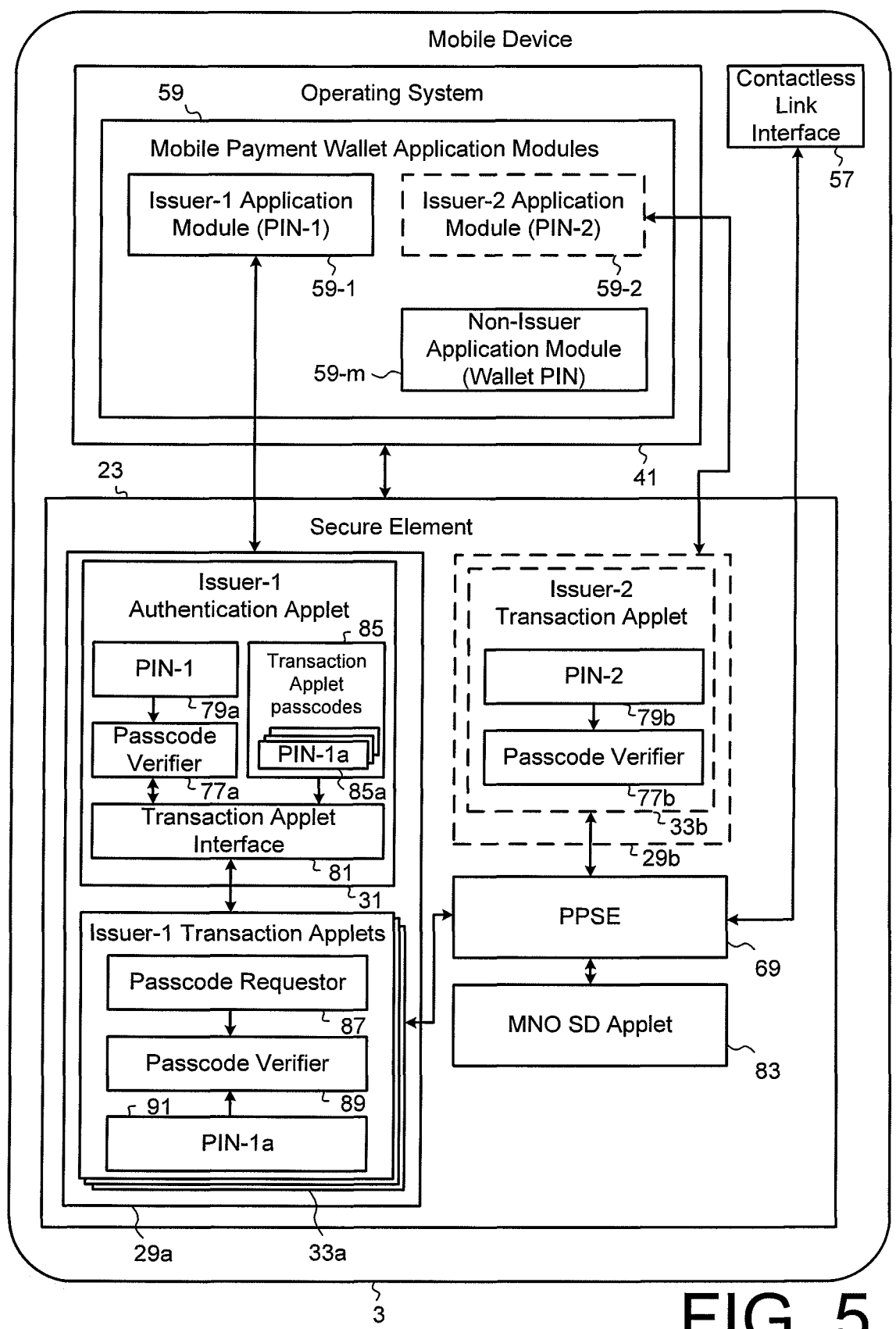
FIG. 5 is a block diagram showing the main functional elements of the mobile device shown in FIG. 2 according to a second embodiment of the invention.

A second alternative embodiment will now be described using corresponding reference numerals to those of preceding figures where appropriate for corresponding elements. FIG. 5 is a block diagram showing the main functional elements of the mobile device 3 when configured to execute processing instructions of the transaction applets 33 and the authentication applet 31. In the first embodiment described above, single passcode control is provided by the central authentication applet 31 in the issuer wallet applet 29a controlling the passcode verification for the subordinate transaction applets 33a. In this embodiment, the passcode verification process involves a passcode requestor 87 in the subordinate transaction applet 33a directly calling the authentication applet 31 to retrieve an associated transaction applet passcode for automatic passcode verification by a passcode verifier 89 in the transaction applet 33a. The authentication applet 31 stores its known value of the transaction passcodes 85 internally in the secure element 23 for the transaction applets 33a to use. In this way, the security mechanism of this embodiment effectively simulates user passcode entry to manage multiple passcodes to multiple applets.

As will be discussed in greater detail below, and in accordance with this second embodiment, the Issuer-1 authentication applet 31 in the secure wallet application module 29a also provides a passcode verifier 77a functional element for verifying a passcode 79a (referred to as PIN-1) associated with the Issuer-1 wallet applet 29a and a transaction applet interface 81 for communicating with the plurality of issuer-1 transaction applets 33a. The authentication applet 31 stores a plurality of Issuer-1 transaction applet passcodes 85 associated with the Issuer-1 transaction applets 33a (referred to as PIN-1a to PIN-1n), in addition to the single controlling passcode 79a as in the first embodiment. Additionally, each of the subordinate Issuer-1 transaction applets 33a in this embodiment stores a respective applet passcode 91, corresponding to the transaction applet passcodes 79a stored and controlled by the authentication applet 31, and requires verification of the transaction applet passcode 91 as part of the authentication process.

Figure 6:
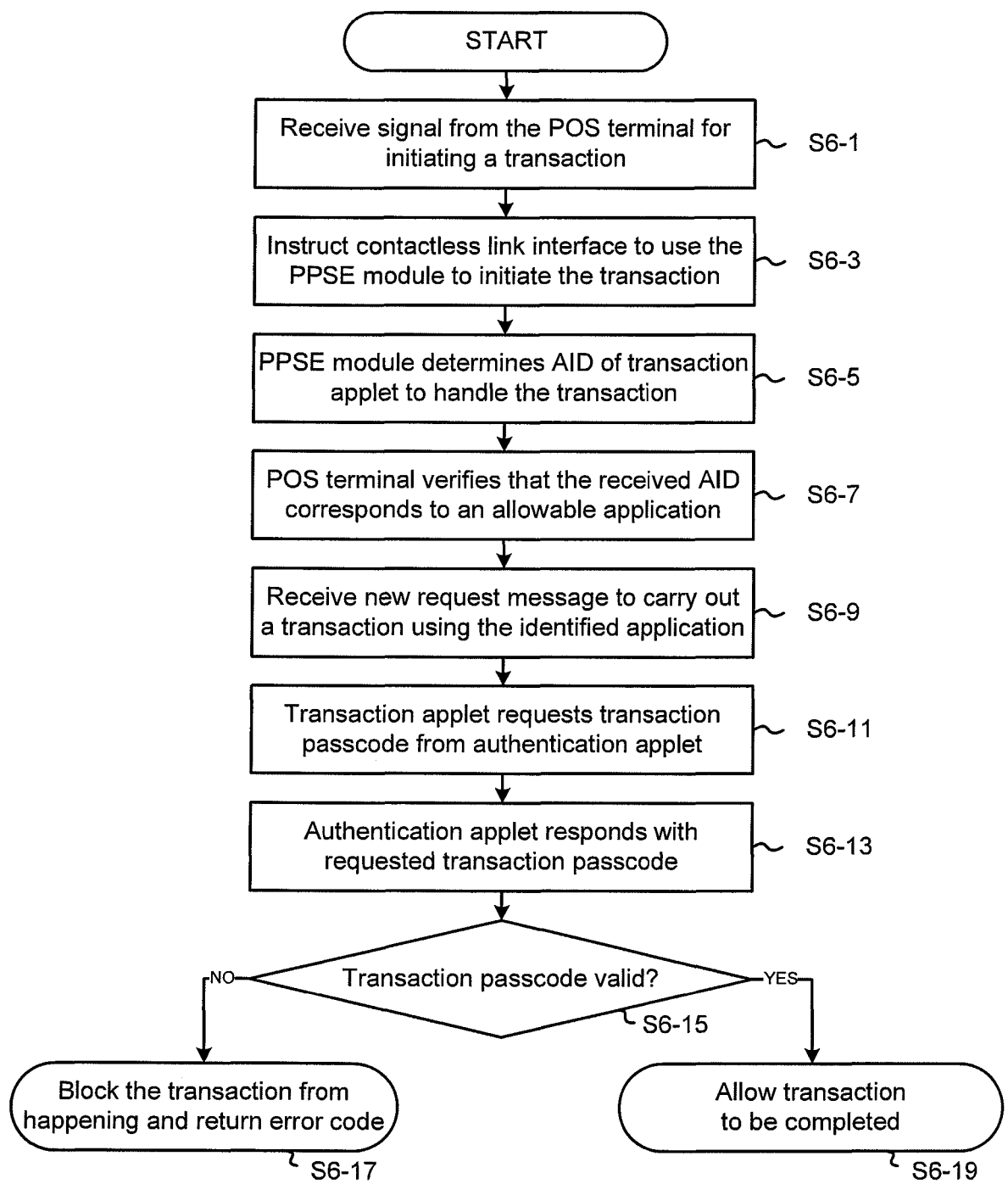
FIG. 6 is a flow diagram illustrating the main processing steps performed by the mobile device of FIG. 5 in a mobile transaction process according to the second embodiment.

FIG. 6 illustrates a computer-implemented process for a contactless mobile transaction where the plurality of transaction applets 33a associated with a payment account issuer 9 perform passcode validation for a transaction process by requesting the passcode from the central authentication applet 31. As shown in FIG. 6, the mobile transaction process begins at step S6-1 where the contactless communication link interface 57 and PPSE module 69 picks up or receives a signal from the POS terminal 5 for initiating a transaction. The processing steps up to S6-9 correspond to steps S4-1 to S4-9 of the first embodiment and are not repeated here for conciseness.

In accordance with this second embodiment, after the contactless communication link interface 57 has received the new request message at step S6-9, the subordinate transaction applet 33a performing the transaction will call the interface 81 on the authentication applet 31, at step S6-11, to request a passcode 79a to complete the transaction. In response, the Issuer-1 authentication applet 31 will determine if the single controlling passcode (PIN-1) 79a has been correctly entered by the user prior to the transaction request, or proceed to request input of the single controlling passcode by the user as described above. If the passcode verifier 77a determines that the passcode 79a is correct and the authentication applet 31 is in a state where it is allowing transactions, the authentication applet 31 will retrieve the transaction applet passcode 85a (PIN-1a) for the requesting transaction applet 33a and proceed to communicate the retrieved transaction applet passcode 85a back to the Issuer-1 transaction applet 33a. Alternatively, the authentication applet 31 is configured to process user input and verification of the single controlling passcode PIN-1 using the passcode verifier 77a in the authentication applet 31 as required before responding to the request from the transaction applets 33a.

Therefore, at step S6-13, the authentication applet 31 will respond with a retrieved transaction applet passcode 85 and any supporting data for the applet to use in the transaction. At step S4-15, the transaction applet passcode 85 received the authentication applet 31 is checked by the passcode verifier 89 in the subordinate transaction applet 33a to determine if it matches the stored transaction applet passcode 91. If the passcodes do not match, then at step S6-17, the transaction applet 33a proceeds to block the transaction from happening and map to a specific error code. On the other hand, if the transaction applet passcode authentication was successful, then at step S6-19, the transaction applet 33a proceeds to allow the transaction to take place.

In a further alternative method, the authentication applet 31 can be used to broadcast the appropriate transaction passcode to the designated transaction applet for use, after validating the user using a single controlling passcode. In this alternative, the user using the wallet application would provide the authentication applet 31 with the controlling passcode 79a along with which transaction applet is to be used for the subsequent transaction. The controlling passcode 79a would be verified by the passcode verifier 77a in the authentication applet 313 in the same manner as the first embodiment, but instead of waiting for a transaction applet 33a to ask for a transaction applet passcode for verification, the authentication applet 31 would communicate to the transaction applet 33a with the appropriate transaction passcode 79a.

The authentication applet 31 can effectively translate any transaction passcodes 79a necessary to the transaction applets 33a if necessary. This can allow for the wallet application 29a to not necessarily use the same passcode 79a or even restrict the single controlling passcode 79a to the same mechanisms prescribed by the transaction applets 33a.

The transaction applets 33a in this embodiment can keep a respective predefined number of allowed passcode entry attempts, as described in the first embodiment. It will be appreciated that this should be minimally used as the authentication applet 31 is storing the appropriate transaction applet passcodes, and access control therefore limits access to the transaction applets 33a.

Alternative Embodiments

It will be understood that embodiments of the present invention are described herein by way of example only, and that various changes and modifications may be made without departing from the scope of the invention.

For example, in the embodiments described above, the mobile device includes a communication interface for facilitating communications over a respective type of contactless communication link. As an alternative, the mobile device may include a plurality of communication interfaces for enabling the plurality of transaction applets to carry out contactless communications over a plurality of respective types of contactless communication links. In this way, the mobile device would be capable of conducting contactless transactions over a combination of contactless communication links such as near field communication (NFC), infra-red and/or optical (eg. for bar code scanning), ultra-sonic, radio frequency (eg. RFID), wireless such as Bluetooth or Wi-Fi based on the IEEE 802.11 standards, and any other communication link that does not require direct physical contact.

As a further embodiment, the mobile device may be additionally or alternatively configured for conducting mobile transaction operations over any other form of communication link that requires a contact and/or coupling of communication interfaces. In this case, the mobile device may include a plurality of transaction modules operable to process mobile transaction operations with a respective transaction account over a communication link via an associated communication interface of the mobile device. Preferably but not essentially, at least one of the transaction modules is configured for contactless transaction operations over at least one type of contactless communication link.

In the embodiments described above, the mobile payment account is provisioned on a mobile handset which communicates with the account management system via a cellular telephone network. Instead of a mobile handset, other portable electronic devices configured for contactless payment with a merchant electronic POS, and having suitable input and display means, may carry out the functionality of authenticating a transaction using a central authentication module, as described in the above embodiment. Additionally, the portable electronic device is configured to communicate with the account activation system via any other form of communication channel instead of or in addition to the above discussed over the air channels, such as a wired or wireless network connection, a Bluetooth connection, or the like. Alternatively, the mobile payment account data is provisioned on the portable electronic device by data transfer via any suitable data communication path or by way of a computer readable medium.

In the embodiments described above, the mobile device stores a plurality of application modules (also referred to as computer programs or software) in memory, which when executed enable the mobile device to implement embodiments of the present invention as discussed herein. The software is stored in a computer program product and loaded into the mobile device using any known instrument, such as removable storage disk or drive, hard disk drive, or communication interface, to provide some examples.

In the embodiments described above, the account management system is described as a separate entity to the payment account issuer and the associated payment processing system. The account management system can be provided as an integral part or sub-system of the payment account issuer and/or payment processing system.

In the embodiments described above, the passcodes are personal identification numbers (PINs). Alternatively or additionally, the wallet application could use any other form of passcode such as an alphanumeric passcode, a numeric passcode of varying length, gesture based actions, or facial recognition.

Alternative embodiments may be envisaged, which nevertheless fall within the spirit and scope of the following claims.

The invention claimed is:

1. A mobile device configured as an electronic wallet for transaction operations from a plurality of mobile transaction accounts, the mobile device comprising memory, the memory comprising a secure wallet application module having:
    a first module, an authentication module, and a plurality of transaction modules, each transaction module associated with a different transaction type, the first module having programmed instructions to:
        receive a transaction request from a terminal device, the transaction request associated with a first transaction type of a transaction;
        identify a first transaction module of the plurality of transaction modules that is associated with the first transaction type; and
        transmit a signal to the first transaction module indicating the transaction;
    wherein the authentication module is in communication with the plurality of transaction modules, the authentication module having programmed instructions to:
        receive a controlling passcode from a particular issuer of a plurality of issuers;
        store the controlling passcode in the memory of the mobile device;
        receive an authentication request from the first transaction module;
        receive a user input passcode;
        verify the received user input passcode on the mobile device by comparing the user input passcode to the stored controlling passcode;
        responsive to verifying the controlling passcode, retrieve a first unique transaction passcode from a database of the authentication module, the database stored in the memory;
        generate a response to the received authentication request after the controlling passcode is verified, wherein the response includes the first unique transaction passcode; and
        transmit the generated response to the first transaction module; and
    wherein the plurality of transaction modules are associated with the particular issuer of the plurality of issuers, and wherein each transaction module of the plurality of transaction modules is associated with a unique transaction passcode of a plurality of transaction passcodes associated with the particular issuer, the first transaction module of the plurality of transaction modules having programmed instructions to:
        responsive to receiving the signal indicating the transaction, generate the authentication request, wherein the authentication request includes a request for the first unique transaction passcode associated with the first transaction module;
        transmit the authentication request including the request for the first unique transaction passcode to the authentication module of the secure wallet application module;
        receive a response to the authentication request, wherein the response to the authentication request includes the first unique transaction passcode;
        verify the first unique transaction passcode on the mobile device by comparing the first unique transaction passcode to a transaction passcode stored within the memory; and
        process a transaction operation for the transaction only after verifying the first unique transaction passcode.

2. The mobile device of claim 1, wherein each of the plurality of transaction modules performs an authentication process comprising transmitting to the authentication module a request for confirmation that the plurality of transaction modules can allow the transaction operations to be completed.

3. The mobile device of claim 1, wherein the authentication module transmits the generated response including the first unique transaction passcode to the first transaction module in response to receiving the authentication request.

4. The mobile device of claim 1, wherein the authentication module broadcasts the generated response including the first unique transaction passcode to the first transaction module in response to receiving an indication of the first transaction module from a user associated with the user input passcode.

5. The mobile device of claim 1, wherein the authentication module stores the plurality of transaction passcodes associated with the plurality of transaction modules.

6. The mobile device of claim 5, wherein the authentication module maps the user input passcode to a stored first unique transaction passcode.

7. The mobile device of claim 5, wherein the plurality of transaction passcodes associated with the plurality of transaction modules are the same as the user input passcode.

8. The mobile device of claim 1, further comprising at least one other security domain associated with a different payment account issuer, and at least one other transaction module associated with a different payment account issuer and provided in said at least one other security domain.

9. The mobile device of claim 1, wherein each of the plurality of transaction modules comprises computer-implementable instructions for processing transaction operations with a payment account issuer using a communication protocol.

10. The mobile device of claim 1, wherein at least one of the plurality of transaction modules is configured to process a contactless transaction operation with a payment account issuer using a contactless communication protocol.

11. The mobile device of claim 1, wherein the transaction operations comprise a payment transaction, a ticketing transaction and a coupon transaction.

12. The mobile device of claim 1, wherein the controlling passcode comprises numeric, alphabetic, alphanumeric or non-alphanumeric symbols.

13. The mobile device of claim 1, wherein the authentication module further comprises a counter operable to maintain a count of user input attempts for passcode verification, wherein the authentication module is operable to communicate failure of the passcode verification when the count exceeds a predefined number of attempts.

14. The mobile device of claim 1, further comprising a non-issuer application module operable to process non-issuer related operations associated with the electronic wallet wherein the non-issuer application module is configured to allow an operation to be completed after an authentication process using the authentication module.

15. A system comprising an account management system coupled to at least one payment account issuer, the account management system comprising:
a database storing data associated with a plurality of mobile transaction accounts; and
a middleware server storing computer-implementable instructions to configure a mobile device comprising memory for transaction operations from the mobile transaction accounts, the middleware server comprising:
computer-implementable instructions to provide an authentication module and a plurality of transaction modules to the mobile device, each of the plurality of transaction modules associated with a different transaction type and in communication with a first module, wherein the first module is operable to:
receive a transaction request from a terminal device, the transaction request associated with a first transaction type of a transaction;
identify a first transaction module of the plurality of transaction modules that is associated with the first transaction type; and
transmit a signal to the first transaction module indicating the transaction;
the authentication module being coupled to the plurality of transaction modules, the authentication module operable to:
receive a controlling passcode from a particular issuer of a plurality of issuers;
store the controlling passcode in the memory of the mobile device;
receive an authentication request from the first transaction module;
receive a user input passcode;
verify, in response to the received authentication request, the received user input passcode on the mobile device by comparing the user input passcode to the stored controlling passcode;
responsive to verifying the controlling passcode, retrieve a first unique transaction passcode from a database of the authentication module, the database stored within the memory;
generate a response to the received authentication request after the controlling passcode is verified, wherein the response includes the first unique transaction passcode; and
transmit the generated response to the first transaction module;
wherein the plurality of transaction modules are associated with the particular issuer of the plurality of issuers, wherein each transaction module of the plurality of transaction modules is associated with a unique transaction passcode of a plurality of transaction passcodes associated with the particular issuer; and
computer-implementable instructions to provide the first transaction module of the plurality of transaction modules having an authentication mechanism to:
responsive to receiving the signal indicating the transaction, generate an authentication request, wherein the authentication request includes a request for a first unique transaction passcode associated with the first transaction module;
transmit the authentication request including the request for the first unique transaction passcode to the authentication module of the secure wallet application module;
receive the response to the authentication request, wherein the response to the authentication request includes the first unique transaction passcode;
verify the first unique transaction passcode on the mobile device by comparing the first unique transaction passcode to a transaction passcode stored within the memory; and
process a transaction operation for the transaction only after verifying the first unique transaction passcode.

16. In a mobile device comprising memory, the memory comprising a secure wallet application module having a first module, an authentication module, and a plurality of transaction modules associated with a particular issuer of a plurality of issuers, each transaction module associated with a different transaction type, a method of processing transaction operations from a plurality of mobile transaction accounts in the secure wallet application module, comprising:

using the first module:
        receive a transaction request from a terminal device, the transaction request identifying a first transaction type of a transaction;
        identify a first transaction module of the plurality of transaction modules that is associated with the first transaction type; and
        transmit a signal to the first transaction module indicating the transaction;
    using the plurality of transaction modules, wherein each transaction module of the plurality of transaction modules is associated with a unique transaction passcode of a plurality of transaction passcodes associated with the particular issuer and the first transaction module of the plurality of transaction modules having programmed instructions to:
        responsive to receiving a signal indicating the transaction, generate an authentication request, wherein the authentication request includes a request for a first unique transaction passcode associated with the first transaction module;
        transmit the authentication request including the request for the first unique transaction passcode to an authentication module of the secure wallet application module;
        receive a response to the authentication request, wherein the response to the authentication request includes the first unique transaction passcode;
        verify the first unique transaction passcode on the mobile device by comparing the first unique transaction passcode to a transaction passcode stored within the memory; and
        process a transaction operation for the transaction only after verifying the first unique transaction passcode; and
    using the authentication module coupled to the plurality of transaction modules, the authentication module having programmed instructions to:
        receive a controlling passcode from a particular issuer of a plurality of issuers;
        store the controlling passcode in the memory of the mobile device;
        receive the authentication request from the first transaction module;
        receive a user input passcode;
        verify the received user input passcode on the mobile device by comparing the user input passcode to the stored controlling passcode;
        responsive to verifying the controlling passcode, retrieve the first unique transaction passcode from a database of the authentication module, the database stored within the memory;
        generate the response to the received authentication request after the controlling passcode is verified, wherein the response includes the first unique transaction passcode; and
        transmit the generated response to the first transaction module.

17. The mobile device of claim 1, wherein the mobile device is in communication with the terminal device via a near-field communication link, the authentication module having further programmed instructions to:
    receive the transaction request via the near-field communication link; and
    responsive to processing the transaction operation, transmitting, via the near-field communication link, an indication that the transaction operation was processed to the terminal device.

* * * * *